(12) United States Patent
Inoue et al.

(10) Patent No.: US 7,929,177 B2
(45) Date of Patent: Apr. 19, 2011

(54) IMAGE FORMING DEVICE AND METHOD FOR LIGHT INTENSITY CORRECTION

(75) Inventors: Nozomu Inoue, Matsumoto (JP); Kiyoshi Tsujino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1314 days.

(21) Appl. No.: 11/457,390

(22) Filed: Jul. 13, 2006

(65) Prior Publication Data

US 2007/0024912 A1 Feb. 1, 2007

(30) Foreign Application Priority Data

Jul. 28, 2005 (JP) ................. 2005-218192

(51) Int. Cl.
*G06K 15/10* (2006.01)
*G06F 3/12* (2006.01)
*H04N 1/46* (2006.01)
*G03G 15/01* (2006.01)

(52) U.S. Cl. ....... 358/1.8; 358/1.13; 358/3.06; 358/534; 347/118

(58) Field of Classification Search ............... 358/1.8, 358/3.06, 3.09, 3.13, 3.26, 1.13, 504, 520, 358/534; 347/118, 115, 130, 131; 345/596
See application file for complete search history.

(56) References Cited

U.S. PATENT DOCUMENTS

2005/0146593 A1 * 7/2005 Yamazaki et al. ............ 347/130

FOREIGN PATENT DOCUMENTS

| JP | 08-142406 | | 6/1996 |
| JP | 2000334999 | A | 12/2000 |
| JP | 2003112442 | A * | 4/2003 |
| JP | 2004-148652 | | 5/2004 |
| JP | 2005119104 | A | 5/2005 |

* cited by examiner

*Primary Examiner* — Thomas J Lett
(74) *Attorney, Agent, or Firm* — DLA Piper LLP (US)

(57) ABSTRACT

An image forming device includes an image generating section that generates an image including a plurality of screen types, an image processing section that performs a grayscale screen process on the image and generates grayscale data and screen type data for each pixel, a line head to which the grayscale data for each pixel section is sequentially transmitted, and a light intensity correction circuit that corrects light intensity of each pixel. The image processing section transmits the screen type data for each pixel to the light intensity correction circuit. The light intensity correction circuit transmits a light intensity correction value for each pixel to the line head. The light intensity correction value for each pixel is obtained based on the corresponding screen type data so that pixels of different screen types of the image are corrected in accordance with the corresponding screen types.

9 Claims, 6 Drawing Sheets

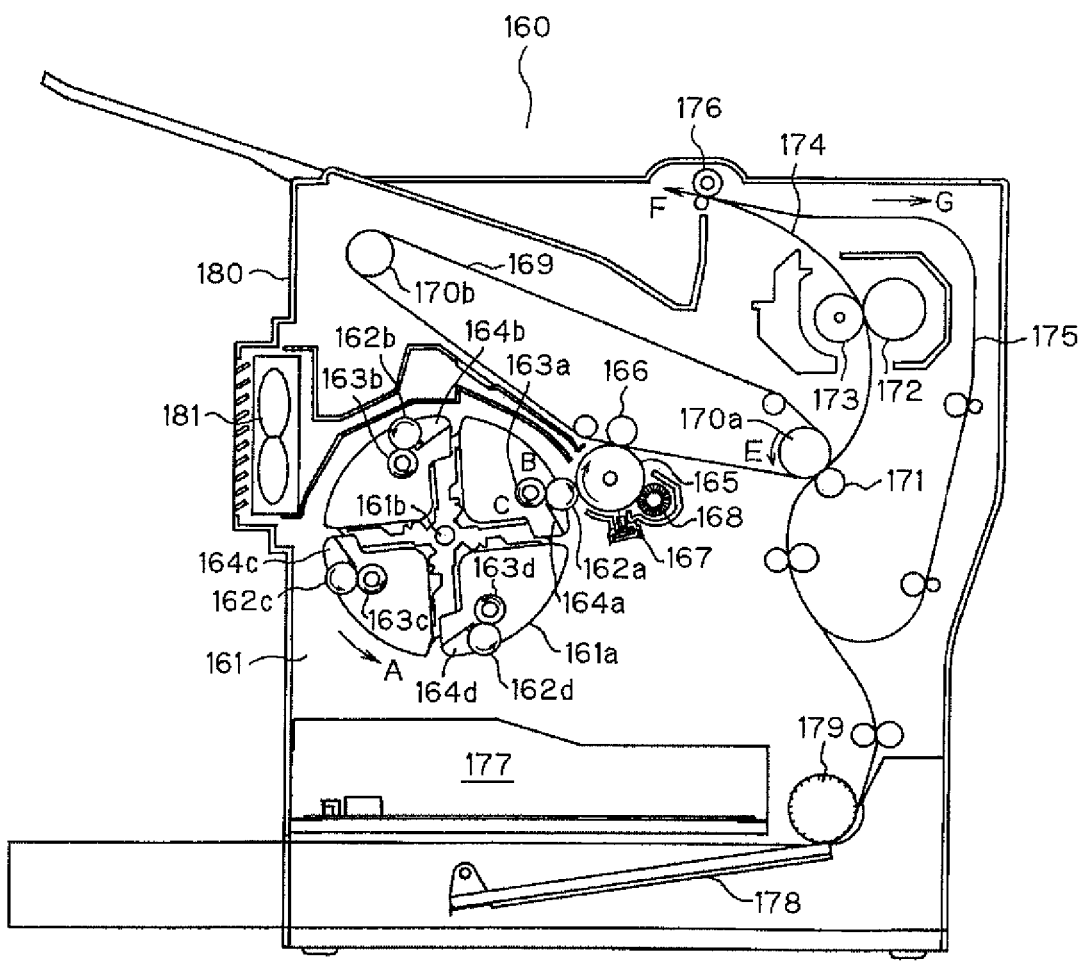
FIG. 6
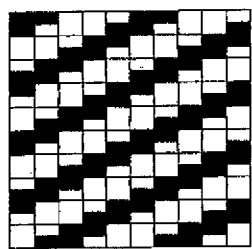 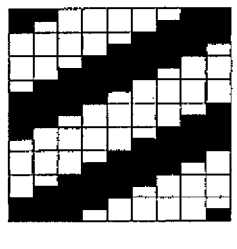 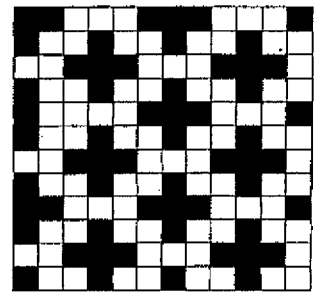
FIG. 7A    FIG. 7B    FIG. 7C

IMAGE FORMING DEVICE AND METHOD FOR LIGHT INTENSITY CORRECTION

BACKGROUND

1. Technical Field

The present invention relates to an image forming device and an image forming method performing a grayscale screen process.

2. Related Art

A line head provided to an image forming device has a number of light emitting sections corresponding to the printing width. By moving an image holding unit such as a photoconductor in a direction (sub-scanning direction) perpendicular to an arranging direction (main-scanning direction) of the light emitting sections, two-dimensional image formation is performed. In general, there are considerable difficulties in equalizing the light intensities of that number of light emitting sections. Further, even if the light intensities of the light emitting sections are even, unevenness in transmittance of the optical system for projecting the light beams from the respective light emitting sections on the image holding unit results in uneven light intensity distribution on the image holding unit. Such unevenness in light intensity distribution causes vertical stripes or belts on an image, which degrade the image quality. In order for solving this problem, it is generally conducted to make the light intensity distribution on the image holding unit even by correcting the light intensity of every light emitting section.

However, there are some cases in which it is still difficult to obtain an even image only by equalizing the light intensity distribution on the image holding unit. A fiber lens array (e.g., SELFOC™ lens array, product of Nippon Sheet Glass Co., Ltd.), which is often used for focusing an image of the light emitting sections on the image holding unit, causes unevenness in shape and size of the image on the image holding unit depending on variation in characteristics and an arrangement of the fibers used therein, and may cause defects in the image derived from the unevenness. In order for avoiding the image defects caused by the variation in the focusing performance, JP-A-8-142406 discloses a method of correcting variation in image quality by controlling the light intensity in accordance with breadth of the light intensity distribution of the beam spot focused thereon.

Meanwhile, in digital printing of a grayscale image, the image is often expressed using area-modulation. Namely, the contrasting density of an image is expressed by the size of halftone dots or the thickness of lines. However, if the focusing conditions are different in every pixel forming the screen, variation in the contrasting density is caused for every pixel. Further, the degree of variation in the contrasting density may vary depending on the screen process of the image to be printed. In order for solving such a problem, JP-A-2004-148652 shows a method of calculating a light intensity correction value for every light emitting section (pixel) in accordance with given information regarding the angle of a screen.

The related art as described above can exert the effect of eliminating the variation in contrasting density of an image with specific kind of screens, but there were some cases in which the effect was not exerted with different kind of screens. FIGS. 7A through 7C are explanatory diagrams each showing an example of the structure of a screen. FIGS. 7A and 7B show examples of the screens having the same angles but different pitches (number of lines). As shown in the drawings, in the cases with the same screen angles and different screen pitches (number of lines), the same correction values exert different effects. Further, FIG. 7C shows an example of a screen having different structure from those shown in FIGS. 7A and 7B. As shown in the drawings, in the cases having different screen structures, it is no longer possible to simply determine the correction values in accordance only with the screen angles.

Further, images to be input to the image forming device are not limited to natural pictures (photographs), but include various types of images, such as line drawings, graphics, or characters. A type of a screen to be used is selected in accordance with the type of the image as described above. For example, screens with fine pitch as shown in FIG. 7A are used for graphs, drafts, or line drawings, which require high resolution. And, for natural pictures such as photographs, which give greater importance to gradation than resolution, screens with rather rough pitch as shown in FIG. 7B are used. Since this kind of selection is performed even in the same page, even among pixels lighting at the same turn, different screens may be used therefor according to location. In these cases, the coping method of using static screen information throughout the same page as shown in JP-A-2004-148652 does not work.

SUMMARY

An advantage of some aspects of the invention is to provide an image forming device and an image forming method having a configuration capable of performing preferable image formation even in the case of using different screens in the same page.

An image forming device according to an aspect of the invention includes an image generating section that generates an image based on input information, an image processing section that performs a grayscale screen process on the image generated by the image generating section, a line head, to which grayscale data for every pixel output from the image processing section is sequentially transmitted, and that exposes an image holding unit by emitting light from light emitting sections for every line, and a light intensity correction circuit that corrects light intensity of every pixel of the line head, wherein the image processing section transmits information of a type of the screen used in the grayscale screen process to the light intensity correction circuit for every pixel, and the light intensity correction circuit transmits a light intensity correction value for every pixel to the line head, the light intensity correction value being obtained based on the information of the type of the screen by one of calculation and selection from values previously stored in a memory. According to this configuration, in a monochrome image forming device, for example, even if various different structures of screens are used in the same page, preferable image formation can be performed.

Further, an image forming device according to another aspect of the invention includes an image generating section that generates an image based on multicolor input information, an image processing section that performs a grayscale screen process on the multicolor image generated by the image generating section for every color, a plurality of line heads, to which grayscale data of respective colors for every pixel output from the image processing section is sequentially transmitted, and that exposes a plurality of image holding units corresponding to respective colors by emitting light from light emitting sections for every line, and a light intensity correction circuit that corrects light intensity of every pixel of the plurality of line heads, wherein the image processing section transmits information of a type of the screen used in the grayscale screen process for every color to the light intensity correction circuit for every pixel, and the light intensity correction circuit transmits a light intensity correction value for every pixel to the corresponding one of the line heads, the light intensity correction value being obtained based on the information of the type of the screen by one of calculation and selection from values previously stored in a memory. According to this configuration, in a tandem type color image forming device, for example, even if various different structures of screens are used in the same page, preferable image formation can be performed.

Further, an image forming device according to still another aspect of the invention includes an image generating section that generates an image based on multicolor input information, an image processing section that performs a grayscale screen process on the multicolor image generated by the image generating section for every color, a line head, to which grayscale data for every pixel output from the image processing section is sequentially transmitted, and that sequentially exposes an image holding unit for every color by emitting light from light emitting sections for every line; and a light intensity correction circuit that corrects light intensity of every pixel of the line head, wherein the image processing section transmits information of a type of the screen used in the grayscale screen process for every color to the light intensity correction circuit for every pixel, and the light intensity correction circuit transmits a light intensity correction value for every pixel to the line head, the light intensity correction value being obtained based on the information of the type of the screen by one of calculation and selection from values previously stored in a memory. According to this configuration, in a rotary type color image forming device, for example, even if various different structures of screens are used in the same page, preferable image formation can be performed.

Further, the image forming device according to another aspect of the invention includes an intermediate transfer medium. According to this configuration, in an image forming device provided with an intermediate transfer medium, for example, even if various different structures of screens are used in the same page, preferable image formation can be performed.

Further, in the image forming device according to another aspect of the invention, the light emitting sections include organic EL elements. According to this configuration, in an image forming device using the organic EL elements as the light emitting sections, for example, even if various different structures of screens are used in the same page, preferable image formation can be performed.

Further, an image forming method according to still another aspect of the invention includes the step of measuring light intensity of every pixel, the step of calculating basic correction values with which light intensities become even, the step of measuring profile value of light intensity distribution of every pixel, the step of generating an image according to image data, the step of performing a screen process for generating pixel data regarding a type of screen used in the image generating step and grayscale data of every pixel, the step of generating light intensity correction data for every pixel based on the basic correction value, the profile value, the pixel data regarding the type of screen, the step of transmitting the light intensity correction data for every pixel and the grayscale data for every pixel to a line head, and the step of exposing an image holding unit by emitting light from light emitting sections of the line head. According to this configuration, the basic correction value is obtained by measuring light intensity for every pixel, and the light intensity correction is performed by measuring the profile value of light intensity distribution of every pixel. Therefore, even in the case in which various screens with different structures are used in the same page, image formation with high accuracy and good quality can be performed. Further, the light intensity correction data is generated for every pixel based on the basic correction value, the profile value, and the pixel screen type data throughout all of the pixels. Therefore, the control for equalizing the light intensity with high accuracy can be performed.

Still further, in the image forming method according to another aspect of the invention, one or more of line heads are additionally provided, the screen process performing step is executed for every color of a multicolor image, and a plurality of image holding units corresponding to respective colors are exposed in the exposing step.

Further, in the image forming method according to another aspect of the invention, one or more of image holding units are additionally provided, the screen process performing step is executed for every color of a multicolor image, and a plurality of image holding units are sequentially exposed for every color in the exposing step.

Further, in the image forming method according to another aspect of the invention, a toner image formed on the image holding unit is transferred to an intermediate transfer medium. As described above, in tandem type image formation, in rotary type image formation, or in image formation using the intermediate transfer medium, image formation with high accuracy and good quality can be performed.

According to the invention, since the light intensity correction is performed for every pixel in accordance with the type of the screen, even in the case in which different screens are used in the same page, preferable image can be obtained.

BRIEF DESCRIPTION OF THE DRAWINGS

The invention will now be described with reference to the accompanying drawings, wherein like numbers refer to like elements.

FIG. 6 is a vertical cross-sectional side view showing another example of the image forming device according to an embodiment of the invention.

FIGS. 7A through 7C are explanatory diagrams each showing an example of the structure of a screen.

DESCRIPTION OF EXEMPLARY EMBODIMENTS

Figure 2:
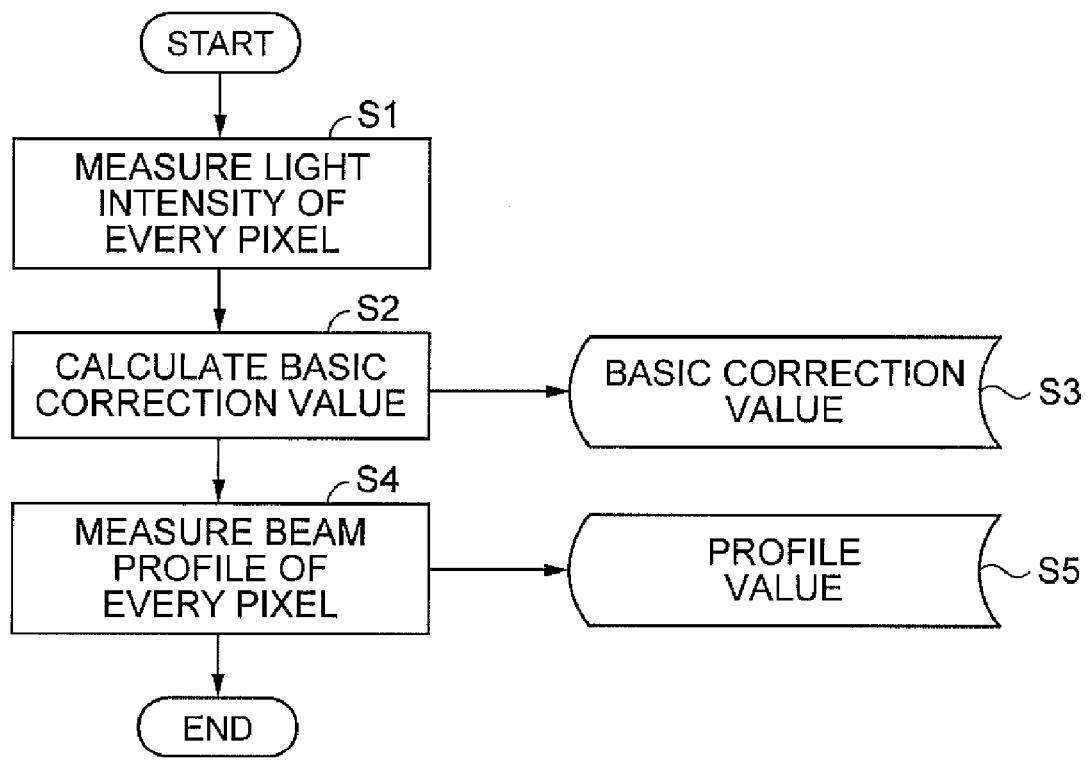
FIG. 2 is a flowchart showing a processing procedure of the embodiment of the invention.

FIG. 2 is a rough flowchart showing a basic processing procedure according to an embodiment of the invention. The process starts with measurement of light intensity of every pixel (S1). Then basic correction values are calculated (S2), and the basic correction values are stored in a memory (S3). Subsequently, a beam profile of every pixel (a profile of light intensity distribution of every pixel) is measured (S4). The profile values are stored in the memory (S5). As shown in FIG. 2, in the embodiment of the invention, the light intensity of every pixel is measured to calculate the basic correction value, and the profile value of the light intensity distribution of every pixel is measured to perform the light intensity correction. Therefore, even in the case in which various screens with different structures are used in the same page, image formation with high accuracy and good quality can be performed.

Figure 3:
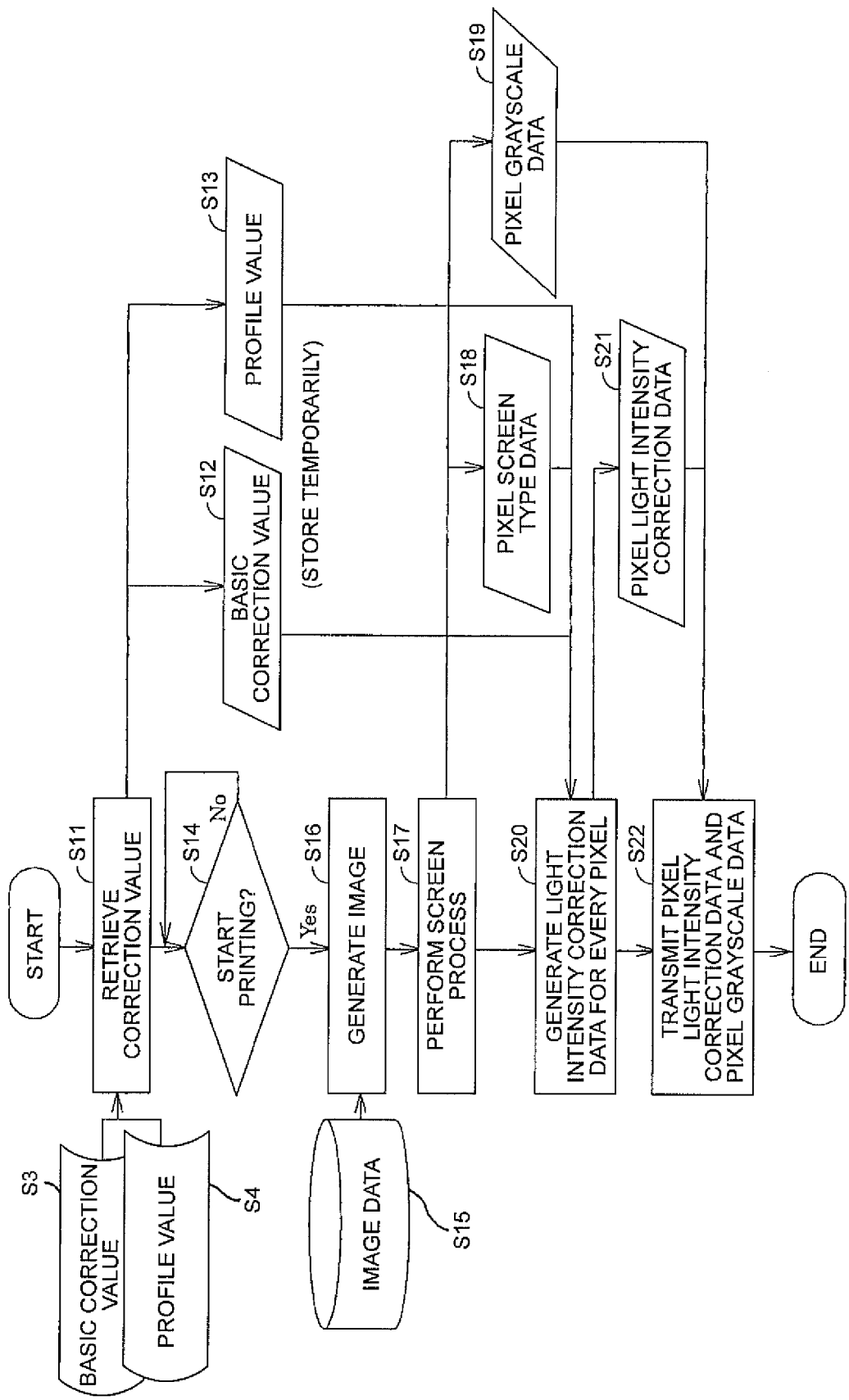
FIG. 3 is a flowchart showing a processing procedure of the embodiment of the invention.

FIG. 3 is a rough flowchart showing a processing procedure for performing light intensity correction for every pixel according to the embodiment of the invention. When the process is started, the basic correction values (S3) and the profile values (S5) stored in the memory in the process shown in FIG. 2 are read out as light intensity correction values (S11). The retrieved data are temporarily stored as the basic correction values (S12) and the profile values (S13).

Subsequently, whether or not the printing operation has been started is judged (S14). If the result of the judgment is NO, the judgment process is repeated. After the judgment result becomes YES, the process proceeds to the image formation step (S16). The image formation is carried out with image data (S15) supplied directly from the outside or by retrieving image data (S15) previously stored in the memory. Then, the screen process is performed (S17). In the screen process, pixel screen type data (S18) and pixel grayscale data (S19) are generated and stored temporarily.

In the process of generating the light intensity correction data for every pixel (S20), the basic correction value (S12), the profile value (S13), and the pixel screen type data (S18) are retrieved to generate the light intensity correction data for every pixel. The pixel light intensity correction data (S21) is stored temporarily. Subsequently, the pixel light intensity correction data (S21) stored temporarily and the pixel grayscale data (S19) are retrieved, and the pixel light intensity correction data and the pixel grayscale data are transmitted to the light intensity correction circuit explained in FIG. 1 (S22). In the example of FIG. 2, the light intensity correction data is generated for every pixel based on the basic correction value, the profile value, and the pixel screen type data throughout all of the pixels. Therefore, the control for equalizing the light intensity with high accuracy can be performed.

In the embodiment of the invention, a tandem type color printer (image forming device), which exposes four photoconductors with four line heads, forms an image with four colors at one time, and transfers it to one endless intermediate transfer belt, is intended.

Figure 4:
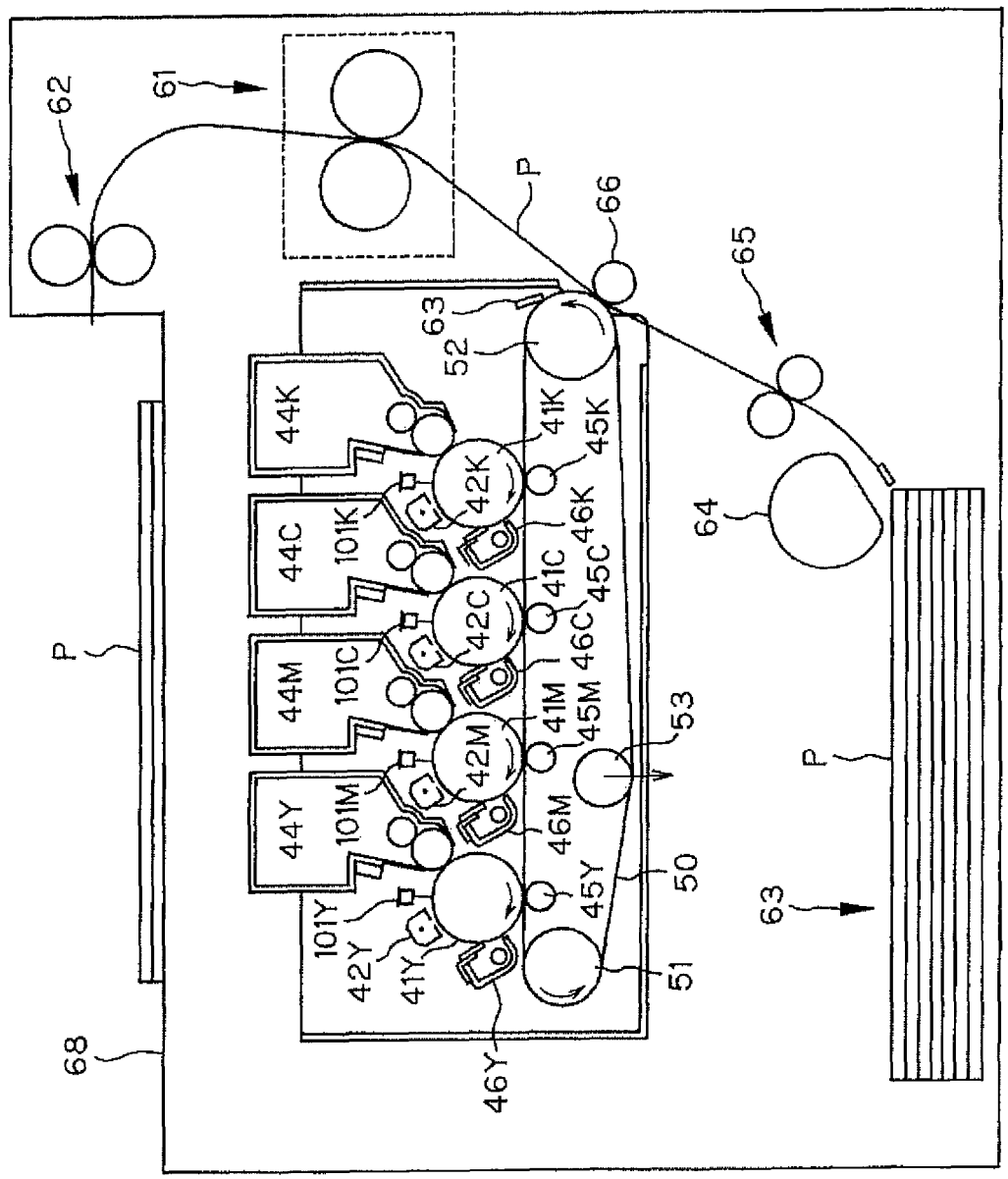
FIG. 4 is a schematic cross-sectional view showing an overall configuration of an example of an image forming device applying an electrophotographic process according to an embodiment of the invention.

FIG. 4 is a vertical cross-sectional side view showing an example of the tandem type image forming device using organic EL as light emitting elements. This image forming device includes four units of organic EL array exposure heads 101K, 101C, 101M, and 101Y each having the same configuration and disposed at a position for exposing respective one of four units of photoconductor drums (image holding units) 41K, 41C, 41M, and 41Y each having the same configuration, and is configured as the tandem type image forming device.

As shown in FIG. 4, the image forming device is provided with a drive roller 51, a driven roller 52, a tension roller 53, and an intermediate transfer belt (intermediate transfer unit) 50 stretched across the rollers to be tensioned by the tension roller 53 and circulated in the direction of the arrows (counterclockwise) shown in the drawing. The four photoconductors 41K, 41C, 41M, and 41Y, each having a photoconductor layer on the outer periphery are disposed along the intermediate transfer belt 50 with predetermined intervals as the image holding units.

It should be noted that the letters K, C, M, and Y added to the respective reference numerals denote black, cyan, magenta, and yellow, respectively to show that the photoconductors are dedicated to the colors, black, cyan, magenta, and yellow, respectively. The same is applied to other members.

The photoconductors 41K, 41C, 41M, and 41Y are rotationally driven in the direction of the arrows (clockwise) shown in the drawing in sync with driving of the intermediate transfer belt 50.

Around the photoconductors 41 (K, C, M, Y), there are provided charging member (corona charger) 42 (K, C, M, Y) for evenly charging the outer periphery surfaces of the photoconductors 41 (K, C, M, Y), and organic EL array exposure heads (line heads) 101 (K, C, M, Y) according to the invention as described above for sequentially line-scanning the outer periphery surfaces evenly charged by the charging members 42 (K, C, M, Y) in sync with the rotation of the photoconductors 41 (K, C, M, Y), respectively.

Further, there are provided developing devices 44 (K, C, M, Y) for providing toner as a developer to the electrostatic latent image formed by the organic EL array exposure heads 101 (K, C, M, Y) to form a visible image (toner image), first transfer rollers 45 (K, C, M, Y) as transfer units for sequentially transferring the toner image developed by the developing devices 44 (K, C, M, Y) to the intermediate transfer belt 50 as a first transfer object, and cleaning devices 46 (K, C, M, Y) as cleaning members for removing toner remaining on the surfaces of the photoconductors 41 (K, C, M, Y) after the transfer process, respectively.

Here, the organic EL array exposure heads 101 (K, C, M, Y) are disposed so that the arranging direction of the organic EL array exposure heads 101 (K, C, M, Y) is parallel to the generating lines of the photoconductor drums 41 (K, C, M, Y), respectively. And, it is arranged that the peak energy wave length of the organic EL array exposure heads 101 (K, C, M, Y) is substantially equal to the peak sensitivity frequency of the photoconductors 41 (K, C, M, Y), respectively.

The developing devices 44 (K, C, M, Y) use, for example, non-magnetic monocomponent toner as the developer, feed the monocomponent developer to developing rollers by, for example, a supply roller, limit the thickness of the developer adhered to the surfaces of the developing rollers by limiting blades, contact or press the developing rollers to or against the photoconductors 41 (K, C, M, Y) to provide the developer to the photoconductors 41 (K, C, M, Y) in accordance with the electrical potential level thereof, thereby developing the toner image, respectively.

Each of the four toner images of black, cyan, magenta, and yellow each formed by the monochromatic toner image forming station is sequentially first-transferred on the intermediate transfer belt 50 in accordance with the first transfer bias applied to the first transfer rollers 45 (K, C, M, Y). The full color toner image formed by sequentially stacking the four toner images of respective colors on the intermediate transfer belt 50 is then second-transferred to a recording medium P such as a paper sheet in a second-transfer roller 66, and then fixed on the recording medium P by passing through a fixing roller pair 61 as a fixing section, and then discharged on a paper receiving tray 68 provided to the top section of the device by a paper discharge roller pair 62.

It should be noted that in FIG. 4, the reference numeral 63 denotes a paper feed cassette in which many recording media P are stacked and held, the reference numeral 64 denotes a pick-up roller for feeding the recording media P from the paper feed cassette 63 one by one, the reference numeral 65 denotes a gate roller pair for defining feed timing of the recording medium P to the second-transfer section composed of the second-transfer roller 66, the reference numeral 66 denotes the second-transfer roller as a second transfer member forming a second-transfer section together with the intermediate transfer belt 50, and the reference numeral 67 denotes a cleaning blade as a cleaning member for removing toner remaining on the surface of the intermediate transfer belt 50 after the second-transfer process.

As described above, since the image forming device shown in FIG. 4 uses the organic EL array as the writing member, downsizing of the device can be achieved compared to the case with the laser scanning optical system. It should be noted that in the image forming device shown in FIG. 4, the writing member is not limited to the organic EL array, but can be configured using LEDs.

Figure 1:
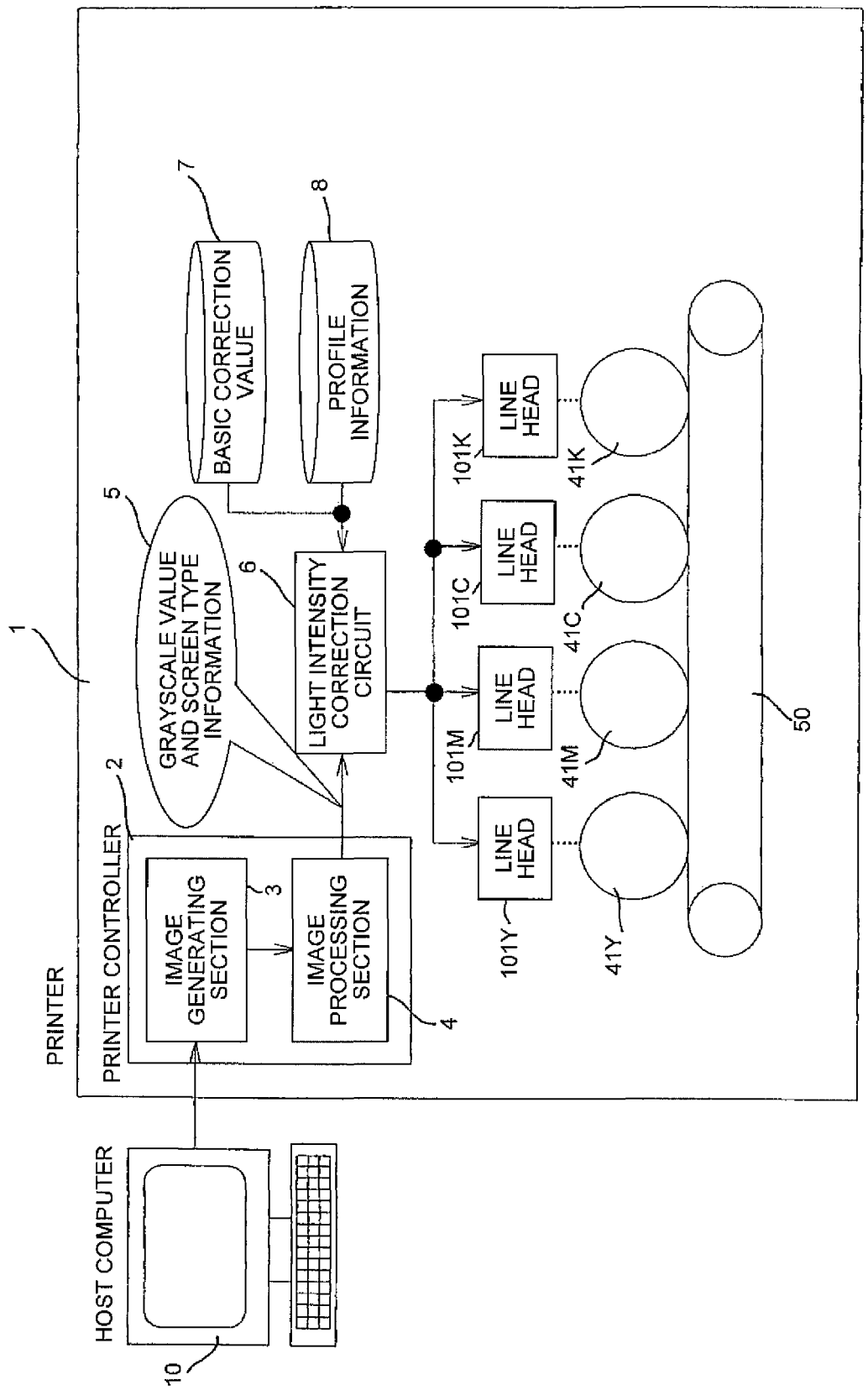
FIG. 1 is a block diagram showing an embodiment of the invention.

FIG. 1 is a block diagram showing an example of the embodiment of the invention. In FIG. 1, a printer (image forming device) 1 is connected to a host computer 10, and receives image data created by the host computer 10 with a printer controller 2. A configuration in which the image data is directly supplied to the printer controller 2 from a personal computer, a network device, a digital camera, or a scanner instead of the host computer 10 can also be adopted.

The image data supplied to the printer controller 2 is generated on the memory by an image generating section 3 in the printer controller 2 as a two-dimensional digital image. Line drawings or characters are also generated in this stage as grayscale data for every pixel. Further, conversion of resolution or color conversion of a color image from RGB to CMYK is also performed in the image generating section 3 according to needs.

In order for performing area modulation on the two-dimensional image data thus generated, the screen process is performed by an image processing section 4 provided inside the printer controller 2. In accordance with the arrangement information and the grayscale information of various kinds of screens as explained in association with FIGS. 7A through 7C, the image data is converted into arrangement of dots or lines. At this time, besides the grayscale data for every pixel to be transmitted to the line heads 101 (Y, M, C, K), data screen type information representing the type of the screen used in the image processing is also transmitted for every pixel. It should be noted that the configurations of the line heads 101 (K, C, M, Y), the photoconductors 41 (K, C, M, Y), and the intermediate transfer belt 50 are the same as explained in association with FIG. 4.

Meanwhile, regarding the light intensity correction value for every pixel, firstly, a correction value capable of equalizing the intensity of light transmitted through the fiber lens array (SELFOC™ lens array) in every pixel is used as a base of calculation. The correction value is referred to as "basic correction value." The light intensity of every pixel is typically measured in the manufacturing process of the line head, and the correction value for equalizing the light intensity is typically attached to every head.

The light intensity correction circuit 6 determines the correction value to be actually transmitted to the line heads 101 (K, C, M, Y) in accordance with the basic correction value for every pixel previously provided for every line head 101 (K, C, M, or Y) and the screen type data information. The light intensity correction is realized by controlling the drive current, or by controlling the lighting period of every pixel. In the line heads 101 (K, C, M, Y) used in the embodiment of the invention, a function of transmitting the grayscale value and the correction value to the light intensity correction circuit 6 every time the line exposure is performed and performing the exposure with a different correction value every time is required.

As an example, influence of focusing profile of the pixel will hereinafter be explained. When the pitch of the screen used in a certain pixel is fine, interference with the pixel on the adjacent line on the screen becomes stronger, and therefore, the pixel is easily affected by the focused light intensity profile. For example, if a certain pixel is inferior in the focusing power to other neighboring pixels, the light intensity distribution does not become sharp with low peak and broad bottom.

Such a pixel behaves similarly to other pixels in the screen with a wide pitch, but in the screen with a narrower pitch, is apt to be squashed blackly due to the interference with adjacent pixels. It should be noted that the phenomenon is nothing but an example, the tendency is different depending on the developing conditions, characteristics of the toner, density of the grayscale screen in use. Therefore, the correction for slightly increasing light intensity is performed on a pixel having a tendency to decrease the intensity.

In order for performing such a process, it is possible to previously prepare a corresponding number of sets of correction values to the number of screen types based on the basic correction values for later selection of the light intensity correction values. Further, it is also possible to prepare the data of light intensity distribution profile for every pixel, as described above, for determining the correction values by calculation based on the screen type information and the basic correction values.

Further, if it is difficult to store the light intensity distribution profiles of all of the pixels, it is also possible to perform such a process as to classify them according to the shapes (e.g., spot sizes) of the profiles into a several ranks for adjusting the basic correction values based on the classification and the screen type information. As described above, the light intensity correction values can be transmitted to the line heads after being calculated based on the screen type information, or being selected from those previously stored in the memory.

Further, the basic correction values and/or the light intensity distribution profiles (or the classification values) can be stored in a memory embedded in the line heads 101 (K, C, M, Y) or can be stored in the main body of the printer. The light intensity correction circuit 6 can be provided to the line heads, or to the image processing section 4. Or alternatively, it can be provided between the image processing section 4 and the line heads 101 (K, C, M, Y) as an independent correction circuit. The image generating section 3 and the image processing section 4 are separately shown in FIG. 1 only for the sake of explanation, and accordingly, they can be included in the same board or in the same semiconductor element.

Further, although the screen type information can be transmitted from the image processing section 4 to the light intensity correction circuit 6 by every pixel, if the amount of data becomes problematically large, the data of plural pixels can be transmitted in a lump. Further, when sequentially transmitting the pixel data from the image processing section 4 to the light intensity correction circuit 6, screen type switching information can only be transmitted in the boundary where the screen type is switched, thereby reducing the amount of data to be transmitted.

Figure 5:
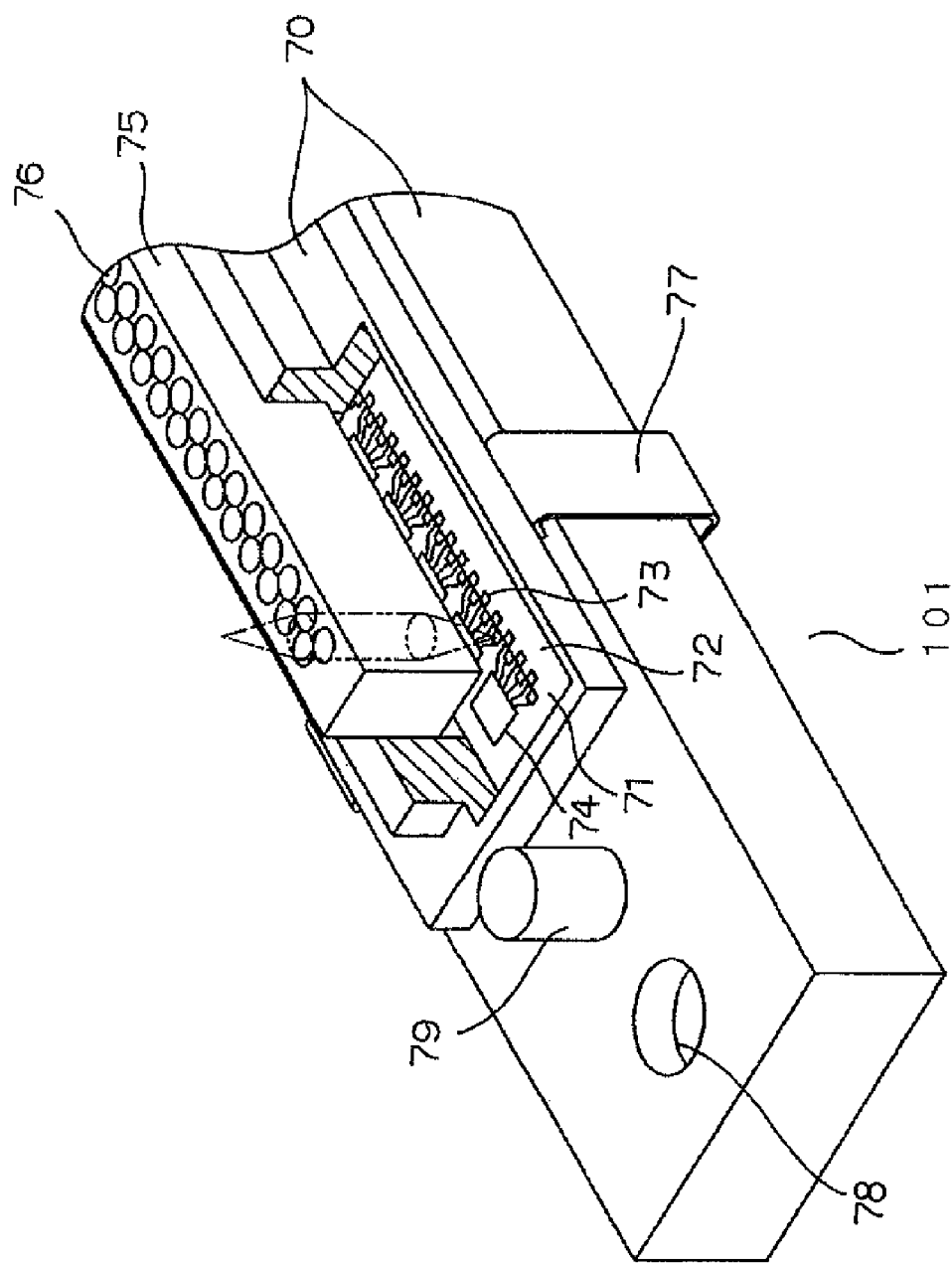
FIG. 5 is an enlarged schematic perspective view of image writing section of the image forming device shown in FIG. 4.

FIG. 5 is an enlarged schematic perspective view of image writing section 101. In FIG. 5, the organic EL element array 71 is held inside an elongated housing 70. Positioning pins 79 provided to both ends of the elongated housing 70 are fitted into positioning holes provided to the opposing positions of a case, and setscrews are screwed in and fixed to screw holes of the case through screw inserting holes 78 provided to both ends of the elongated housing 70, thereby fixing each of image writing members 101 to a predetermined position.

In the image writing member 101, light emitting sections 73 of the organic EL element array 71 are mounted on the glass substrate 72, and the organic EL element array 71 is driven by a TFT drive circuit 74 formed on the same glass substrate 72. The TFT drive circuit 74 is for driving the light emitting elements in an active matrix system. A gradient index rod lens array 75 forms an imaging optical system, and has gradient index rod lenses 76 in the closest manner, each disposed in front of respective one of the light emitting sections 73. The housing 70 covers the periphery of the glass substrate 72 and is opened in the side facing the image holding unit. Thus, light beams are emitted form the gradient index rod lenses 76 to the image holding unit.

As shown in FIG. 5, the line head according to the embodiment of the invention includes the light emitting elements and the TFT drive circuit for driving the light emitting element with the active matrix system both formed on the substrate. The light emitting elements have a basic configuration of performing the grayscale control using the pulse width control (PWM control). If the line head having such a configuration is installed at an angle with the reference position in the main scan direction, the correction therefor is performed using the pulse width control.

Although in the embodiment shown in FIGS. 1 and 4, the example of application to the tandem type color printer (image forming device) is explained, the invention is not limited to such an image forming device only. The invention can also be applied to a four cycle type color printer (image forming device), which is provided with a single photoconductor and one line head, sequentially forms four images of respective one of four colors, and stacks them on the intermediate transfer belt.

The four cycle type color printer (image forming device), which is another embodiment, will now be explained as an image forming device according to the invention. FIG. 6 is a vertical cross-sectional view of the image forming device. In FIG. 6, the image forming device 160 is provided with a developing device 161 having a rotary structure, a photoconductor drum 165 functions as the image holding unit, an image writing unit (line head) 167 provided with organic EL array, an intermediate transfer belt (intermediate transfer unit) 169, a paper feed path 174, a heating roller of a fuser 172, a paper feed tray 178 as principal composing elements.

In the developing device 161, a developing rotary 161a rotates around a shaft 161b in the direction of the arrow A. The developing rotary 161a is divided into four parts inside thereof, and four image forming units respectively corresponding to four colors, yellow (Y), cyan (C), magenta (M), and black (B) are provided, respectively. The reference numerals 162a through 162d denote developing rollers disposed to the respective image forming units of four colors and rotating in the direction of the arrow B, and the reference numerals 163a through 163d denote toner supply rollers rotating in the direction of arrow C. Further, the reference numerals 164a through 164d denote limiting blades for limiting the thickness of the toner to a predetermined value.

The reference numeral 165 denotes the photoconductor drum functioning as the image holding unit as described above, reference numeral 166 denotes a first-transfer member, reference numeral 168 denotes a charger, reference numeral 167 denotes the image writing unit provided with the organic EL array. The photoconductor drum 165 is driven by a drive motor not shown in the drawings, such as a stepping motor, in the direction of arrow D, which is the inverse direction of the developing roller 162a.

The intermediate transfer belt 169 is stretched across the driven roller 170b and the drive roller 170a, and the drive roller 170a connected to the drive motor of the photoconductor drum 165 transmits power to the intermediate transfer belt. By driving the drive motor, the drive roller 170a of the intermediate transfer belt 169 is rotated in the direction of the arrow E, the inverse direction of the photoconductor drum 165.

Along the paper feed path 174, there are provided a plurality of feed rollers, a discharge roller pair 176, and so on for transmitting the paper. An image (toner image) held by one side of the intermediate transfer belt 169 is transferred to one side of a sheet at a position of the second-transfer roller 171. The second-transfer roller 171 is abutted on or detached from the intermediate transfer belt 169 by a clutch, and when the clutch is on, the second-transfer roller 171 is abutted on the intermediate transfer belt 169 to transfer the image to the sheet.

The fusing process is then preformed on the sheet, to which the image is thus transferred, in the fuser having a fusing heater. The fuser is provided with the heating roller 172 and a pressure roller 173. After the fusing process, the sheet is pulled in by the discharge roller pair 176, and proceeds in the direction of arrow F. When the discharge roller pair 176 is reversed at this condition, the sheet reverses the direction, and proceeds along the double side printing paper feed path 175 in the direction of arrow G. The reference numeral 177 denotes an electric component box, the reference numeral 178 denotes a paper feed tray, the reference numeral 179 denotes a pick-up roller provided to the outlet of the paper feed tray 178.

In the paper feed path, as the drive motor for driving paper feed rollers, for example, a low-velocity brushless motor is used. Further, since the intermediate transfer belt 169 requires color registration correction, a stepping motor is used therefor. Each of these motors is controlled by a control member not shown with a control signal.

In the condition shown in the drawing, the electrostatic latent image for yellow (Y) is formed on the photoconductor drum 165, and when high voltage is applied to the developing roller 62a, the yellow image is formed on the photoconductor drum 165. When the yellow image for backside and yellow image for front side are all held on the intermediate transfer belt 169, the developing rotary 161a rotates 90 degrees in the direction of arrow A.

The intermediate transfer belt 169 makes one revolution to return to the position of the photoconductor drum 165. Subsequently, the cyan (C) images for both faces are formed on the photoconductor drum 165, and then held on the intermediate transfer belt 169 overlapping the yellow images held thereon. After then, the 90 degree rotation of the developing rotary 161, and one revolution process of the intermediate transfer belt 169 after image holding are similarly repeated.

In order for holding four color images, the intermediate transfer belt 169 makes four revolutions, and then the rotational position thereof is further controlled, and the images are transferred to the sheet at the position of the second-transfer roller 171. The sheet fed from the paper feed tray 178 is transmitted along the paper feed path 174, and the color image is transferred to one side of the sheet at the position of the second-transfer roller 171. The sheet with the image transferred on one side is reversed by the discharge roller pair 176, and is queued in the paper feed path. After then, the sheet is transmitted to the position of the second-transfer roller 171 and provided with the color image on the other side thereof with certain timing. An exhaust fan 181 is provided to a housing 180.

The image forming device and the image forming method according to the invention are explained as above based on the principle and the embodiments. However, the invention is not limited to such embodiments, but various modifications are possible.

The entire disclosure of Japanese Patent Application No. 2005-218192, filed Jul. 28, 2005 is expressly incorporated by reference herein.

What is claimed is:

1. An image forming device comprising:
an image generating section that generates an image based on input information;
an image processing section that performs a grayscale screen process on the image generated by the image generating section and generates grayscale data and screen type information for each pixel of the image;
a light intensity correction circuit that receives the grayscale data and the screen type information for each pixel of the image and that generates a light intensity correction value for a light emitting element corresponding to each pixel of the image based on information comprising the screen type information and a basic correction value; and
a line head that receives for each line the grayscale data and the light intensity correction value of each light emitting element, from the light intensity correction circuit, and that exposes an image holding unit by emitting light from light emitting elements for each line of the grayscale data and light intensity correction values received so as to correct the intensity of each light emitting element of each line based on the screen type information and the grayscale data.

2. The image forming device according to claim 1, wherein the input information is multi color information, the image generating section generates a multicolor image based on multicolor input information, the image processing section performs the grayscale screen process on the multicolor image generated by the image generating section for each color, and
a plurality of line heads and a plurality of image holding units are provided corresponding to respective colors.

3. The image forming device according to claim 1, wherein the input information is multi color information, the image generating section generates a multicolor image based on multicolor input information, the image processing section performs the grayscale screen process on the multicolor image generated by the image generating section for each color, and
the line head sequentially exposes the image holding unit for each color.

4. The image forming device according to claim 1, further comprising an intermediate transfer medium.

5. The image forming device according to claim 1, wherein the light emitting elements include organic EL elements.

6. An image forming method comprising:
measuring light intensity of each light emitting element;
calculating basic correction values with which light intensities are adjusted to become even;
measuring a profile value of light intensity distribution of each light emitting element;
generating an image according to image data;
performing a screen process for generating grayscale data and screen type information of each pixel of the image;
generating light intensity correction data for each light emitting element based on the basic correction value, the profile value, the corresponding screen type information of the light emitting element so that the light intensity of each light emitting element of each line of a line head is corrected in accordance with a corresponding screen type;
transmitting for each line of the line head the light intensity correction data for each light emitting element and the grayscale data for each light emitting element; and
exposing an image holding unit by emitting light from light emitting elements of the line head.

7. The image forming method according to claim 6, wherein
one or more of line heads are additionally provided,
the screen process performing step is executed for each color of a multicolor image, and
a plurality of image holding units corresponding to respective colors are exposed in the exposing step.

8. The image forming method according to claim 6, wherein
the screen process performing step is executed for each color of a multicolor image, and
a plurality of image holding units are sequentially exposed for each color in the exposing step.

9. The image forming method according to claim 6, wherein a toner image formed on the image holding unit is transferred to an intermediate transfer medium.

* * * * *